United States Patent
Ozono et al.

(10) Patent No.: US 12,128,715 B2
(45) Date of Patent: Oct. 29, 2024

(54) TIRE PRESSURE MONITORING DEVICE, TIRE PRESSURE MONITORING METHOD AND MONITORING PROGRAM

(71) Applicant: BRIDGESTONE CORPORATION, Tokyo (JP)

(72) Inventors: Keita Ozono, Tokyo (JP); Hiroki Yasuda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 27 days.

(21) Appl. No.: 18/250,755

(22) PCT Filed: May 26, 2021

(86) PCT No.: PCT/JP2021/020027
§ 371 (c)(1),
(2) Date: Apr. 27, 2023

(87) PCT Pub. No.: WO2022/123810
PCT Pub. Date: Jun. 16, 2022

(65) Prior Publication Data
US 2023/0398817 A1 Dec. 14, 2023

(30) Foreign Application Priority Data
Dec. 7, 2020 (JP) .................................. 2020-202900

(51) Int. Cl.
*B60C 23/04* (2006.01)
(52) U.S. Cl.
CPC .................................. *B60C 23/04* (2013.01)
(58) Field of Classification Search
CPC .................................................... B60C 23/04
See application file for complete search history.

(56) References Cited

U.S. PATENT DOCUMENTS 6,445,286 B1 * 9/2002 Kessler ............... B60C 23/0408
340/447
6,446,023 B1 * 9/2002 Ernst ................... B60C 23/0408
340/444

(Continued)

FOREIGN PATENT DOCUMENTS

JP 2005-335525 A 12/2005
JP 2007-196999 A 8/2007

(Continued)

OTHER PUBLICATIONS

International Search Report issued in International Application No. PCT/JP2021/020027 on Aug. 3, 2021.

*Primary Examiner* — Chico A Foxx
(74) *Attorney, Agent, or Firm* — SOLARIS Intellectual Property Group, PLLC (57) ABSTRACT

A monitoring unit that serves as a tire pressure monitoring device includes an acquisition section, a calculation section and a determination section. The acquisition section acquires air pressure data of plural tires mounted at a vehicle. On the basis of the air pressure data, for each tire, the calculation section calculates a first representative value relating to air pressures of the tire in a first period, calculates a second representative value relating to air pressures of the tire in a second period that is longer than the first period, and calculates a decrease level of the first representative value relative to the second representative value. The determination section determines that air pressure is decreasing when the decrease level of one tire is equal to or more than a first threshold value and the decrease level of another tire, which is different from the one tire, is less than the first threshold value.

13 Claims, 7 Drawing Sheets

(56) References Cited

U.S. PATENT DOCUMENTS

| | | | |
|---|---|---|---|
| 7,242,285 B2 | 7/2007 | Shaw | |
| 7,594,433 B2 * | 9/2009 | Bondu | B60C 23/0408 |
| | | | 73/146 |
| 2002/0044051 A1 * | 4/2002 | Sugisawa | B60C 23/061 |
| | | | 340/444 |
| 2004/0123654 A1 * | 7/2004 | Komatsu | B60C 23/0408 |
| | | | 73/146 |
| 2005/0044945 A1 * | 3/2005 | Hammerschmidt | |
| | | | B60C 23/0477 |
| | | | 73/146 |
| 2005/0057348 A1 * | 3/2005 | Hammerschmidt | |
| | | | B60C 23/0474 |
| | | | 340/445 |
| 2005/0241380 A1 * | 11/2005 | Welch | B60C 23/00 |
| | | | 73/146 |
| 2006/0220813 A1 | 10/2006 | Utter et al. | |
| 2007/0191996 A1 | 8/2007 | Bondu | |
| 2007/0279201 A1 * | 12/2007 | Casey | G01L 27/007 |
| | | | 340/442 |
| 2015/0239307 A1 | 8/2015 | Horikoshi et al. | |
| 2022/0185459 A1 * | 6/2022 | Robertson | B60C 23/00318 |

FOREIGN PATENT DOCUMENTS

| | | |
|---|---|---|
| JP | 2009-234298 A | 10/2009 |
| JP | 2014-076748 A | 5/2014 |

\* cited by examiner

TIRE PRESSURE MONITORING DEVICE, TIRE PRESSURE MONITORING METHOD AND MONITORING PROGRAM

TECHNICAL FIELD

The present invention relates to a tire pressure monitoring device, a tire pressure monitoring method and a monitoring program.

BACKGROUND ART

Decreases in air pressure in tires include rapid decreases, typified by punctures and bursts, and gradual decreases, referred to as slow leaks. Particularly to detect the latter, slow leaks, for example, Japanese Patent Application Laid-Open (JP-A) No. 2007-196999 proposes a technology that calculates and evaluates day-by-day air pressure history data.

SUMMARY OF INVENTION

Technical Problem

However, because the technology recited in JP-A No. 2007-196999 detects a slow leak in one tire, a determination that a slow leak is occurring may be caused by variations in operating conditions of the vehicle.

An object of the present disclosure is to provide a tire pressure monitoring device, a tire pressure monitoring method and a monitoring program that may detect slow leaks while suppressing false determinations.

Solution to Problem

A tire pressure monitoring device according to the present disclosure includes: an acquisition section that acquires air pressure data of plural tires mounted at a vehicle; a calculation section that, on the basis of the air pressure data of each tire, calculates a first representative value relating to air pressures of the each tire in a first period, calculates a second representative value relating to air pressures of the each tire in a second period that is longer than the first period, and calculates a decrease level of the first representative value relative to the second representative value for the each tire; and a determination section that determines that there is a decrease in air pressure when the decrease level of one of the tires is equal to or more than a first threshold value and the decrease level of another of the tires that is different from the one of the tires is less than the first threshold value.

In the tire pressure monitoring device according to the present disclosure, when the acquisition section acquires air pressure data of each of the plural tires mounted at the vehicle, the calculation section calculates the decrease level for each tire based on the first representative value and the second representative value. The first representative value is a representative value relating to air pressures of the tire in the first period, and the second representative value is a representative value relating to air pressures of the tire in the second period that is longer than the first period. The representative values may be defined as any of mean values, median values and mode values of plural air pressures acquired at different times. Furthermore, the representative values may be any of absolute values of air pressure, relative values to a standard air pressure and relative proportions to the standard air pressure. The decrease level may be a decrease value of the first representative value relative to the second representative value, and may be a proportional decrease of the first representative value relative to the second representative value. In this tire pressure monitoring device, the determination section determines that an air pressure is decreasing when the decrease level of one tire is equal to or more than the first threshold value and the decrease level of another tire that is different from the one tire is less than the first threshold value.

According to this tire pressure monitoring device, when the first representative value that is calculated from short-term air pressure data is compared with the second representative value that is calculated from long-term air pressure data and the obtained decrease level is determined to be equal to or more than the first threshold value, a decrease in air pressure may be detected as a slow leak. However, in this tire pressure monitoring device, even when the decrease level of one tire is equal to or more than the first threshold value, a slow leak of the one tire is detected only if the decrease level of another tire is less than the first threshold value. Therefore, no slow leak is detected when the air pressures of all the tires decrease, for example, when an operating duration of the vehicle is short, when the atmospheric temperature is low and so forth. That is, according to this tire pressure monitoring device, changes in air pressure due to variations in operating conditions of the vehicle are excluded from determination of slow leaks. Thus, false determinations may be suppressed.

Advantageous Effects of Invention

According to the present disclosure, slow leaks may be detected while misjudgments are suppressed.

DETAILED DESCRIPTION

Below, exemplary embodiments of the present disclosure are described in detail with reference to the drawings. Components and processes that are responsible for the same operations and functions may be assigned the same reference numeral in all the drawings and duplicative descriptions thereof may be omitted as appropriate.

First Exemplary Embodiment

—Configurations—

Figure 1:
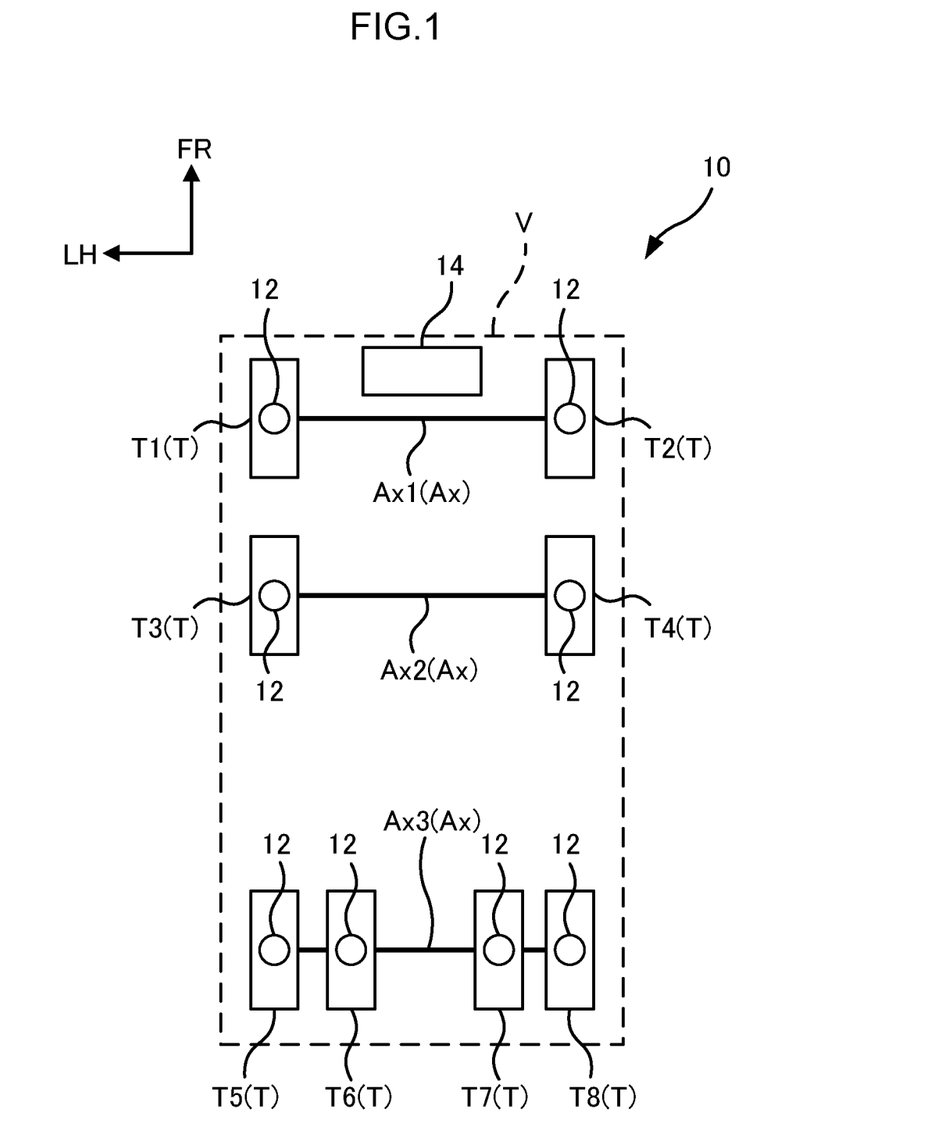
FIG. 1 is a schematic configuration diagram of a vehicle according to a first exemplary embodiment.

As shown in FIG. 1, a tire pressure monitoring system 10 according to the first exemplary embodiment is installed in a vehicle V. The vehicle V according to the present exemplary embodiment is provided with three axles Ax: from a vehicle front side, a first axle Ax1, a second axle Ax2 and a third axle Ax3. The vehicle V is also provided with a plurality of tires T for each of the axles Ax. More specifically, the first axle Ax1 is provided with a tire T1 at a vehicle width direction left side and with a tire T2 at the vehicle width direction right side. The second axle Ax2 is provided with a tire T3 at the vehicle width direction left side and with a tire T4 at the vehicle width direction right side. The third axle Ax3, which is a rear wheel axle Ax, is provided with a tire T5 and a tire T6 at the vehicle width direction left side and with a tire T7 and a tire T8 at the vehicle width direction right side.

The tire pressure monitoring system 10 according to the present exemplary embodiment includes sensor units 12 mounted at each of the tires T and a monitoring unit 14 that serves as a tire pressure monitoring device, which is provided at a driver seat of the vehicle V.

Each sensor unit 12 is a device having functions for acquiring air pressure data of the corresponding tire T and sending the air pressure data to the monitoring unit 14. The sensor unit 12 may be a device provided inside the tire T, being mounted at a wheel or the tire T or such, or may be a device provided outside the tire T, such as at a tire valve.

Figure 2:
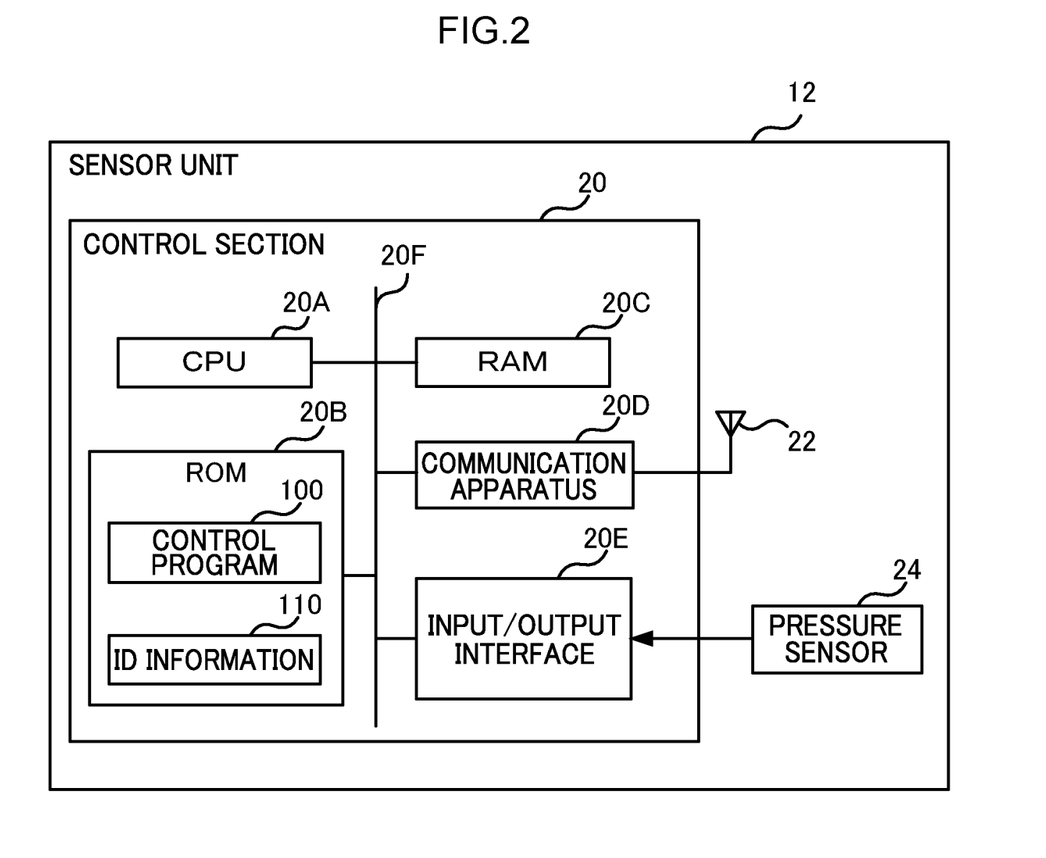
FIG. 2 is a block diagram showing hardware configurations of a sensor unit according to the first exemplary embodiment.

As shown in FIG. 2, each sensor unit 12 according to the present exemplary embodiment comprises a control section 20, an antenna 22 and a pressure sensor 24.

The control section 20 comprises a central processing unit (CPU) 20A, read-only memory (ROM) 20B, random access memory (RAM) 20C, a communication apparatus 20D and an input/output interface 20E. The CPU 20A, ROM 20B, RAM 20C, communication apparatus 20D and input/output interface 20E are connected to be capable of communicating with one another via an internal bus 20F.

The CPU 20A is a central arithmetic processing unit that reads a program from the ROM 20B and executes the program using the RAM 20C as a work area.

The ROM 20B stores various programs and various kinds of data. A control program 100 for controlling the sensor unit 12 and ID information 110 are stored in the ROM 20B according to the present exemplary embodiment. In the ID information 110, an individual terminal ID of the sensor unit 12 is stored to identify the tire T.

The RAM 20C serves as a work area and temporarily stores programs and data.

The communication apparatus 20D features functions for wireless communications with the monitoring unit 14. A communications system that is employed is a previously known system. It is sufficient for the communication apparatus 20D of the sensor unit 12 to have a transmission function. The antenna 22 is connected to the communication apparatus 20D.

The input/output interface 20E is an interface for connecting with other equipment constituting the sensor unit 12. The pressure sensor 24 is connected to the input/output interface 20E of the sensor unit 12. The pressure sensor 24 may be directly connected to the internal bus 20F. A sensor of a previously known system can be employed as the pressure sensor 24.

In each sensor unit 12, the pressure sensor 24 detects air pressures of the tire T at which the sensor unit 12 is mounted. Each sensor unit 12 assigns the terminal ID stored in the ID information 110 to air pressure data acquired by the detection and sends the air pressure data to the monitoring unit 14.

The monitoring unit 14 is a device having functions for monitoring air pressures of each of the tires T on the basis of the air pressure data received from the respective sensor units 12.

Figure 3:
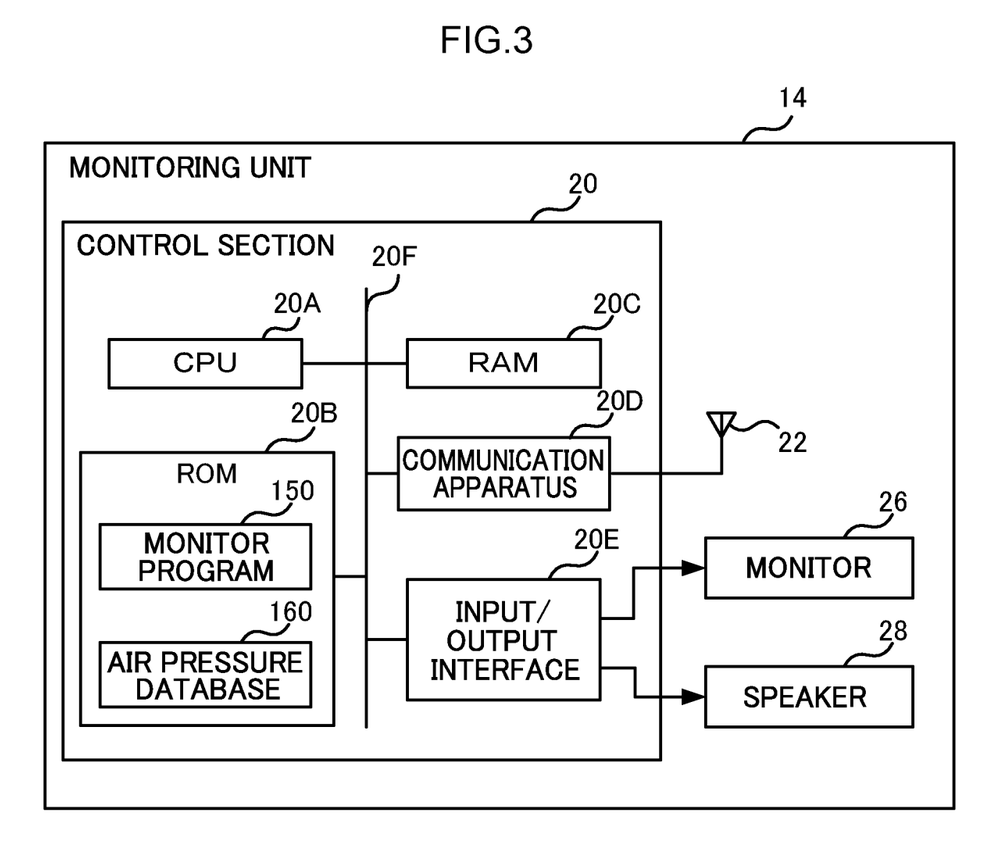
FIG. 3 is a block diagram showing hardware configurations of a monitoring unit according to the first exemplary embodiment.

As shown in FIG. 3, the monitoring unit 14 according to the present exemplary embodiment comprises another of the control section 20, another of the antenna 22, a monitor 26 and a speaker 28.

Configuration of the control section 20 of the monitoring unit 14 is similar to the control section 20 of the sensor unit 12. However, the ROM 20B of the monitoring unit 14 stores a monitor program 150 for controlling the monitoring unit 14 and an air pressure database (DB) 160 that stores data relating to air pressures of the tires T.

The monitor 26 and speaker 28 are connected to the input/output interface 20E of the monitoring unit 14.

The monitor 26 is a display such as, for example, an LCD or the like and is configured to be visible to a driver of the vehicle V.

The speaker 28 is provided in combination with the monitor 26 and outputs voice messages, warning sounds and the like to the driver of the vehicle V.

Figure 4:
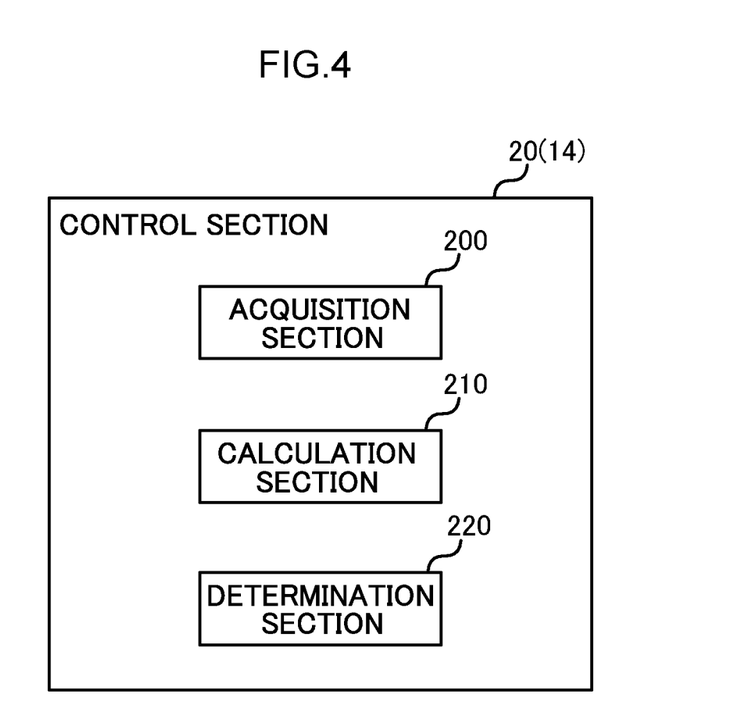
FIG. 4 is a block diagram showing functional configurations of the monitoring unit according to the first exemplary embodiment.

As shown in FIG. 4, the CPU 20A of the monitoring unit 14 executes the monitor program 150 stored in the ROM 20B, whereby the control section 20 functions as an acquisition section 200, a calculation section 210 and a determination section 220.

The acquisition section 200 features functions for acquiring air pressure data of the plural tires T mounted at the vehicle V. The acquisition section 200 acquires the air pressure data at a predetermined time interval. The monitoring unit 14 has relation data between the tires T and the terminal IDs. When the monitoring unit 14 receives air pressure data from each sensor unit 12, the acquisition section 200 acquires the air pressure data of the corresponding tire T according to the terminal ID.

The calculation section 210 features functions for calculating mean values of air pressures of the tires T on the basis of the air pressure data acquired at the acquisition section 200. The calculation section 210 calculates a first mean value for each tire T, which is the mean value of air pressures of the tire T in a first period. The calculation section 210 also calculates a second mean value, which is the mean value of air pressures of the tire T in a second period. The calculation section 210 further calculates a decrease value of the first mean value relative to the second mean value, that is, the value obtained by subtracting the second mean value from the first mean value, for each tire T.

This first period is a minimum unit of time in administration of operations of the vehicle V and, for example, is set to 1 day. The second period is a period longer than the first period and, for example, is set to N days (N>2). The first period and second period need not necessarily be set in numbers of days and may be set in numbers of hours. The first mean value is an example of the first representative value, the second mean value is an example of the second representative value, and the decrease value is an example of the decrease level.

Each time the air pressure data is acquired by the acquisition section 200, the calculation section 210 updates the first mean value for that day on the basis of the new air pressure data. Each time the date changes, the calculation section 210 calculates the mean of the first mean values over N days to be the second mean value. If first mean values for N days have not been stored in the air pressure database 160, the calculation section 210 calculates the mean of the first mean values that have been stored to be the second mean value.

The determination section 220 features functions for determining decreases in the air pressures of the tires T. Decreases in air pressure include rapid decreases, such as punctures, and gradual decreases, referred to as slow leaks. When the air pressure of a tire T from the most recently acquired air pressure data falls below a predetermined limit value, the determination section 220 determines that a puncture has occurred.

When a decrease value calculated by the calculation section 210 is equal to or more than a first threshold value and a predetermined condition is satisfied for the corresponding tire T, the determination section 220 determines that a slow leak is occurring. The first threshold value referred to here is a threshold value specified on the basis of records from when slow leaks have occurred previously.

The predetermined condition may be that both of the following are satisfied: (1) the decrease value of another tire, which is on the same axle Ax as the tire T whose decrease value is equal to or more than the first threshold value, is less than the first threshold value; and (2) a difference between a maximum value and minimum value of air pressures in the first period for the tire T whose decrease value is equal to or more than the first threshold value is equal to or less than a second threshold value. This second threshold value is a threshold value that takes account of the increases in air pressure when the tire T is filled with air and decreases in air pressure when the tire T is replaced (that is, when the tire T is reassembled to the wheel), and is set to be more than the first threshold value.

—Control Flow—

Figure 5:
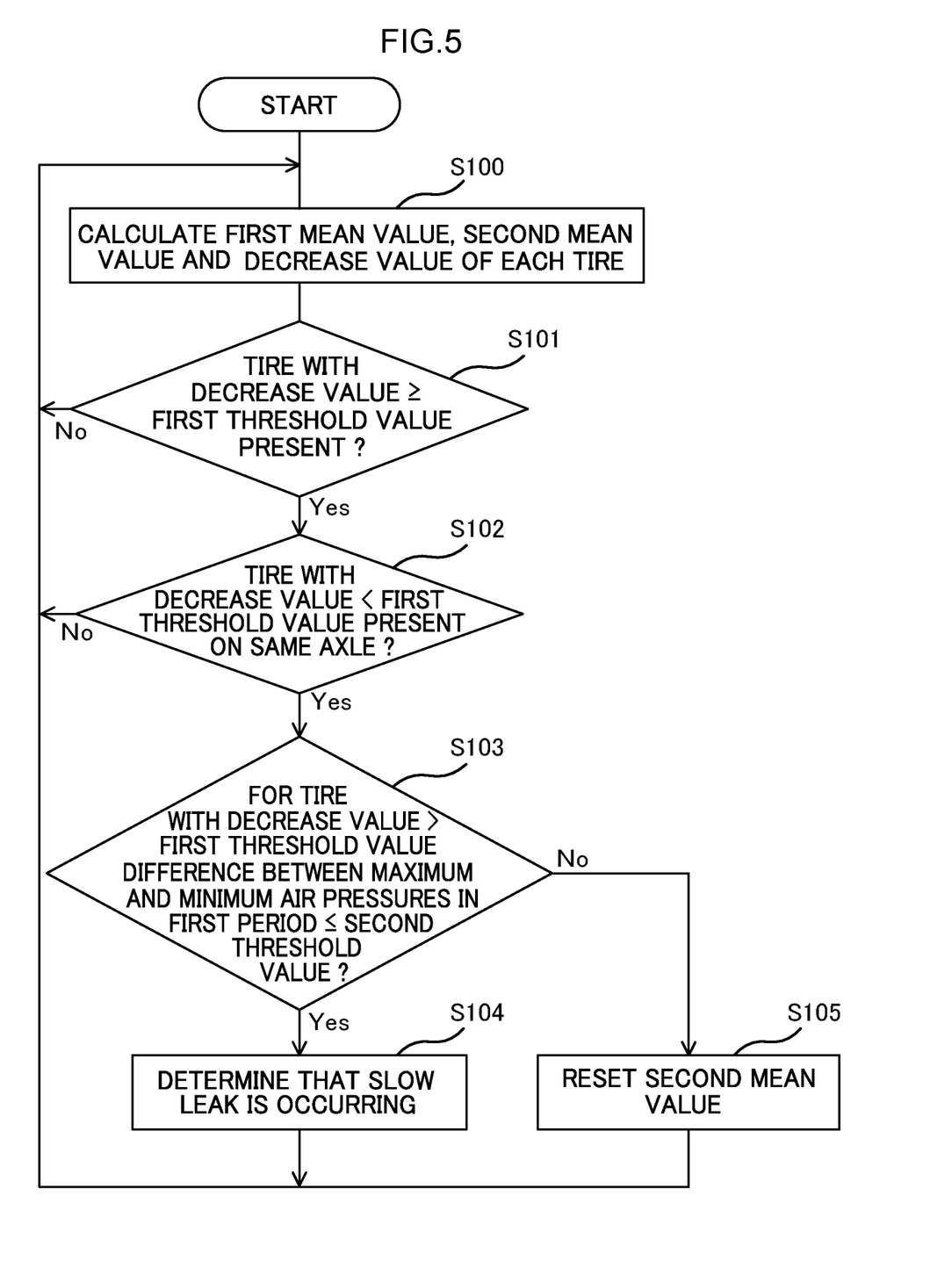
FIG. 5 is a flowchart showing a flow of processing of the monitoring unit.
Figure 6:
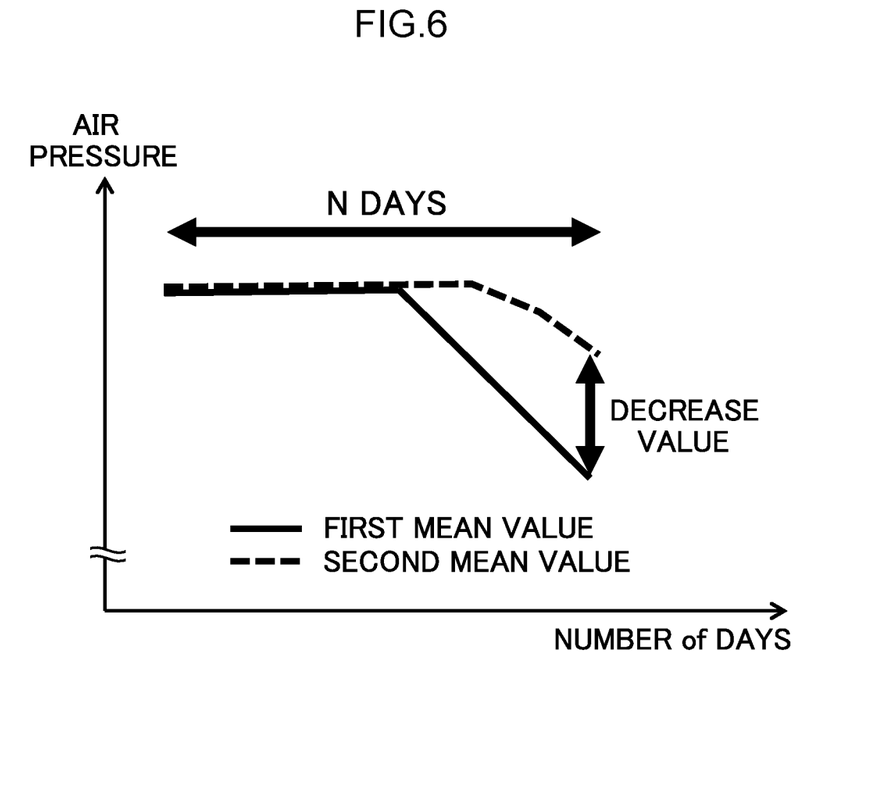
FIG. 6 is a diagram for illustrating a comparison of a decrease value with a first threshold value in the processing of the monitoring unit.
Figure 7:
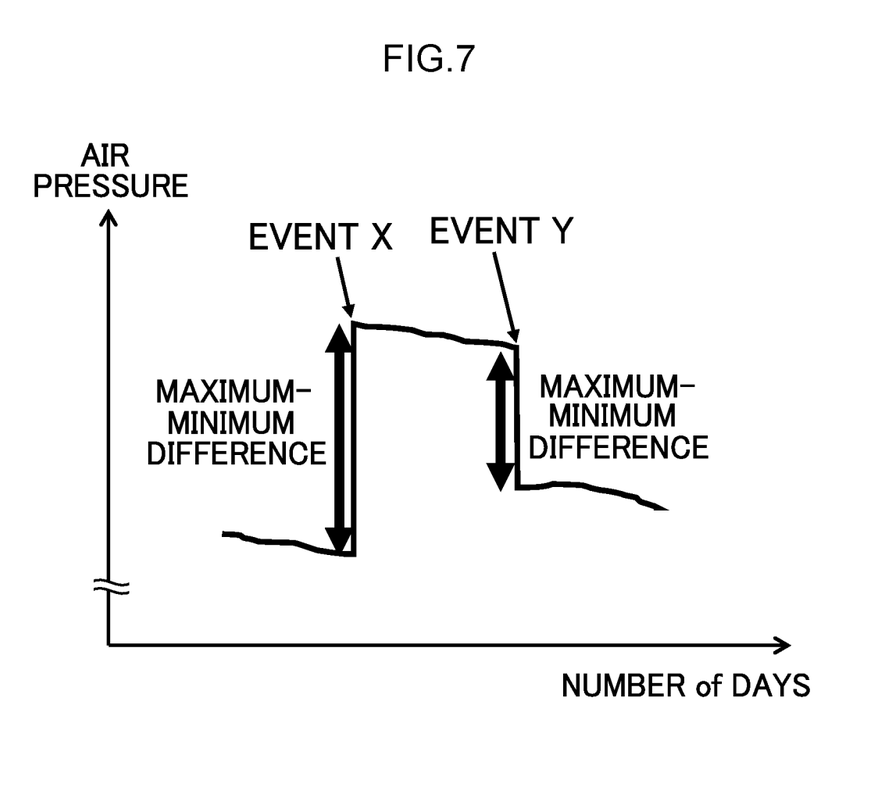
FIG. 7 is a diagram for illustrating comparisons of differences between maximum and minimum values of a first mean value with a second threshold value in the processing of the monitoring unit.

Processing at the monitoring unit 14 according to the present exemplary embodiment for determining a slow leak is illustrated using the flowchart in FIG. 5 and the graphs in FIG. 6 and FIG. 7.

In step S100 of FIG. 5, the CPU 20A of the monitoring unit 14 calculates the first mean value, the second mean value and the decrease value of each tire T.

In step S101, the CPU 20A determines as to whether any of the tires T has a decrease value that is equal to or more than the first threshold value. When the CPU 20A determines that a tire T whose decrease value is equal to or more than the first threshold value is present (that is, when the result in step S101 is "Yes"), the processing proceeds to step S102. On the other hand, when the CPU 20A determines that no tire T is present with a decrease value equal to or more than the first threshold value (that is, when the result in step S101 is "No"), the processing returns to step S100. For example, as illustrated in FIG. 6, on a day N−1 when the decrease value is less than the first threshold value, the CPU 20A repeats step S100, and then on a day N when the decrease value is at least the first threshold value, the processing proceeds to the next step S102.

In step S102 of FIG. 5, the CPU 20A determines as to whether there is a tire T with a decrease value of less than the first threshold value on the same axle Ax as the tire T with the decrease value equal to or more than the first threshold value. When the CPU 20A determines that a tire T whose decrease value is less than the first threshold value is present on the same axle Ax (that is, when the result in step S102 is "Yes"), the processing proceeds to step S103. On the other hand, when the CPU 20A determines that no tire T with a decrease value of less than the first threshold value is present on the same axle Ax (that is, when the result in step S102 is "No"), the processing returns to step S100.

In step S103, the CPU 20A determines for the tire T exceeding the first threshold value as to whether a difference between maximum and minimum air pressures in the first period is equal to or less than the second threshold value. When the CPU 20A determines that the tire T exceeding the first threshold value has a difference between maximum and minimum air pressures in the first period that is equal to or less than the second threshold value (that is, when the result in step S103 is "Yes), the processing proceeds to step S104. On the other hand, when the CPU 20A determines that the tire T exceeding the first threshold value has a difference between maximum and minimum air pressures in the first period that is not less than or equal to the second threshold value (that is, when the result in step S103 is "No), the processing proceeds to step S105.

For example, as illustrated in FIG. 7, when the tire T is filled with air (marked as event X in FIG. 7) and the difference between the maximum and minimum air pressures in the first period exceeds the second threshold value, the processing proceeds to step S105. Alternatively, when the tire T is replaced (marked as event Y in FIG. 7) and the difference between the maximum and minimum air pressures in the first period exceeds the second threshold value, the processing proceeds to step S105.

In step S104 of FIG. 5, the CPU 20A determines that a slow leak is occurring. Accordingly, the monitoring unit 14 may notify the occurrence of the slow leak to a driver of the vehicle V via the monitor 26 or may notify the occurrence of the slow leak to an administrator of the vehicle V via a network, which is not shown in the drawings. Then the processing returns to step S100.

In step S105, the CPU 20A resets the second average value. Then the processing returns to step S100.

—Overview of the Exemplary Embodiment—

In the monitoring unit 14 according to the present exemplary embodiment, the determination section 220 determines that a slow leak is occurring at a tire T for which a decrease value calculated by the calculation section 210 is equal to or more than the first threshold value and the predetermined condition is satisfied. As described above, the predetermined condition may be that both of the following are satisfied: (1) the decrease value of another tire at the same axle Ax as the tire T whose decrease value is equal to or more than the first threshold value is less than the first threshold value; and (2) the difference between the maximum value and minimum value of air pressures in the first period for the tire T whose decrease value is equal to or more than the first threshold value is equal to or less than the second threshold value.

According to the present exemplary embodiment, a slow leak may be detected when the decrease value obtained by comparing the first mean value calculated from short-term air pressure data with the second mean value calculated from long-term air pressure data is equal to or more than the first threshold value (see FIG. 6). However, because condition (1) is specified as a predetermined condition, when the decrease value of one tire T is equal to or more than the first threshold value, a slow leak of the one tire T is detected only when the decrease value of the another tire T is less than the first threshold value. Therefore, a slow leak, is not detected when the air pressures of all the tires T on the same axle Ax decrease, for example, when an operating duration of the vehicle is short, when the atmospheric temperature is low and so forth. That is, according to the present exemplary embodiment, changes in air pressure due to variations in operating conditions of the vehicle are excluded from determination of slow leaks. Thus, false determinations can be suppressed.

Further, because condition (2) is specified as a predetermined condition in the present exemplary embodiment, rapid changes in air pressure in short periods (see FIG. 7), when a tire T is filled with air, replaced or the like, are excluded from determination of slow leaks. Therefore, a misdetection, determining that a slow leak is occurring at a tire T whose air pressure is normal, may be suppressed.

When a slow leak in one tire T is being determined in the present exemplary embodiment, reference is made to air pressures of another tire T mounted on the same axle Ax. For example, plural tires T on driving wheels are likely to be subject to similar driving conditions. According to the present exemplary embodiment, because tires T with similar driving conditions are compared in making determinations, the effects of external conditions may be reduced in making determinations of slow leaks.

Settings of parameters that are used for determinations of slow leaks—the first period, the second period, the first threshold value and the second threshold value—may be altered in accordance with the model of the vehicle V, the weight and loading weight of the vehicle V, and types, sizes and mounting positions of the tires T. Thus, by modification of the parameter settings, slow leaks may be detected at an early stage without reducing slow leak detection accuracy.

Second Exemplary Embodiment

In the exemplary embodiment described above, when a slow leak in one tire T is being determined, reference is made to air pressures of another tire T mounted on the same axle Ax. In the second exemplary embodiment, by contrast, reference is made to air pressures of at least two other tires T mounted on the same axle Ax. Specifically, in the vehicle V according to the present exemplary embodiment, four of the tires T are mounted at the third axle Ax3 and, for example, air pressures of tire T6, tire T7 and tire T8 may be referred to when determining a slow leak at tire T5.

Thus, because the air pressures of plural other tires are referred to when driving a slow leak, the effects of external conditions may be reduced in determining slow leaks even when the air pressures of multiple tires are decreasing at the same time.

Third Exemplary Embodiment

In the third exemplary embodiment, when a slow leak at one tire T is being determined, the another tire T is configured such that a mounting position, at the left side or the right side of the vehicle, of the another tire T is different from that of the one tire T. For example, when a slow leak is being determined at tire T5 on the third axle Ax3, air pressures of the tire T8 are referred to.

Thus, when a slow leak is being determined at one tire T, air pressures of another tire T with a different left-and-right mounting position are referred to. According to the present exemplary embodiment, when determining a slow leak, the effects of a neighboring tire T whose air pressure may decrease at the same time (for example, tire T6 in the example mentioned above), may be excluded.

Remarks

In the exemplary embodiments described above, examples are given in which the first mean value is the first representative value and the second mean value is the second representative value, but this is not limiting. For example, the first representative value may be a median value or mode value of air pressures of each tire T in the first period. As a further example, the second representative value may also be a median value or mode value of air pressures of the tire T in the second period.

In the exemplary embodiments described above, a slow leak is detected with reference to the air pressures of a tire T provided on the same axis Ax, but a slow leak may be detected with reference to the air pressures of a tire T provided on a different axis Ax. For example, when determining a slow leak of a tire T on the third axis Ax3, the air pressures of a tire T on the first axis Ax1 and a tire on the second axis Ax2 may be referred to.

Furthermore, in the exemplary embodiments described above, the first mean value and second mean value are not limited to absolute values of air pressure but may be either of relative values with respect to a standard air pressure and relative proportions with respect to the standard air pressure. When the first mean values and second mean values are relative proportions, slow leaks may be detected with reference to air pressures of tires T of different sizes. Further, in the exemplary embodiments described above, the decrease value is the second mean value subtracted from the first mean value, but may be a proportional decrease of the first mean value relative to the second mean value.

In the exemplary embodiments described above, the first period is set to one day and the second period is set to N days. In this case, when an N-day period includes rest days of the vehicle V, a start date may be pushed ahead in accordance with the number of rest days to assure the availability of air pressure data corresponding to N days. For example, if the second period is five days and air pressures are checked on November 10, each second mean value would usually be calculated as the mean value for the period including November 6, 7, 8, 9 and 10. However, if November 7 was a rest day of the vehicle V, then in order to assure a five-day period, the mean value for the period including November 5, 6, 8, 9 and 10 may be calculated as the second mean value.

The processing that, in the exemplary embodiments described above, is executed by the CPU 20A reading software (a program) may be executed by various kinds of processor other than a CPU. Examples of processors in these cases include a PLD (programmable logic device) in which a circuit configuration can be modified after manufacturing, such as an FPGA (field-programmable gate array) or the like, a dedicated electronic circuit which is a processor with a circuit configuration that is specially designed to execute specific processing, such as an ASIC (application-specific integrated circuit) or the like, and so forth. The processing described above may be executed by one of these various kinds of processors, or may be executed by a combination of two or more processors of the same or different kinds (for example, plural FPGAs, a combination of a CPU with an FPGA, or the like). Hardware structures of these various kinds of processors are, to be more specific, electronic circuits combining circuit elements such as semiconductor elements and the like.

The exemplary embodiments described above are described in an aspect in which programs are stored (installed) in advance at a computer-readable non-transitory recording medium. For example, the control program 100 of the sensor unit 12 is stored in advance at the ROM 20B thereof and the monitor program 150 of the monitoring unit 14 is stored in advance at the ROM 20B thereof. However, this is not limiting and the programs may be provided in forms that are recorded at non-transitory recording media such as a CD-ROM (compact disc read-only memory), DVD-ROM (digital versatile disc read-only memory), USB (universal serial bus) memory or the like. The programs may also be in forms which are downloaded from external equipment via a network.

The flows of processing described in the exemplary embodiments above are examples. Unnecessary steps may be removed, new steps may be added and sequences of processing may be rearranged within a scope not departing from the spirit of the disclosure.

The disclosures of Japanese Patent Application No. 2020-202900 filed Dec. 7, 2020 are incorporated into the present specification by reference in their entirety.

All references, patent applications and technical standards cited in the present specification are incorporated by reference into the present specification to the same extent as if the individual references, patent applications and technical standards were specifically and individually recited as being incorporated by reference.

The invention claimed is:

1. A tire pressure monitoring device comprising a memory and a processor connected to the memory, wherein the processor:
  acquires air pressure data of a plurality of tires mounted at a vehicle;
  based on the air pressure data of each tire, calculates a first representative value relating to air pressures of each tire in a first period, calculates a second representative value relating to air pressures of each tire in a second period that is longer than the first period, and calculates a decrease level of the first representative value relative to the second representative value for each tire; and
  determines that there is a decrease in air pressure when a decrease level of one of the tires is equal to or more than a first threshold value and a decrease level of another of the tires that is different from the one of the tires is less than the first threshold value.

2. The tire pressure monitoring device according to claim 1, wherein the processor determines that there is a decrease in air pressure when the decrease level of the one of the tires is equal to or more than the first threshold value, the decrease level of the other of the tires is less than the first threshold value, and a difference between a maximum value and a minimum value of air pressures of the one of the tires in the first period is equal to or less than a second threshold value.

3. The tire pressure monitoring device according to claim 1, wherein the other of the tires is mounted at a same axle as the one of the tires.

4. The tire pressure monitoring device according to claim 1, wherein the decrease level of the other of the tires is a representative value of decrease levels of at least two of the tires, the at least two tires being mounted at a same axle.

5. The tire pressure monitoring device according to claim 1, wherein a mounting position, at a left side or a right side of the vehicle, of the other of the tires is different from a mounting position, at the left side or the right side of the vehicle, of the one of the tires.

6. The tire pressure monitoring device according to claim 2, wherein the other of the tires is mounted at a same axle as the one of the tires.

7. The tire pressure monitoring device according to claim 2, wherein the decrease level of the other of the tires is a representative value of decrease levels of at least two of the tires, the at least two tires being mounted at a same axle.

8. The tire pressure monitoring device according to claim 2, wherein a mounting position, at a left side or a right side of the vehicle, of the other of the tires is different from a mounting position, at the left side or the right side of the vehicle, of the one of the tires.

9. The tire pressure monitoring device according to claim 3, wherein the decrease level of the other of the tires is a representative value of decrease levels of at least two of the tires, the at least two tires being mounted at a same axle.

10. The tire pressure monitoring device according to claim 3, wherein a mounting position, at a left side or a right side of the vehicle, of the other of the tires is different from a mounting position, at the left side or the right side of the vehicle, of the one of the tires.

11. The tire pressure monitoring device according to claim 4, wherein a mounting position, at a left side or a right side of the vehicle, of the other of the tires is different from a mounting position, at the left side or the right side of the vehicle, of the one of the tires.

12. A tire pressure monitoring method, wherein a computer executes processing that includes:
  acquisition processing that periodically acquires air pressure data of a plurality of tires mounted at a vehicle;
  calculation processing that, based on the air pressure data of each tire, calculates a first representative value relating to air pressures of each tire in a first period, calculates a second representative value relating to air pressures of each tire in a second period that is longer than the first period, and calculates a decrease level of the first representative value relative to the second representative value for each tire; and
  determination processing that determines that there is a decrease in air pressure when a decrease level of one of the tires is equal to or more than a first threshold value and a decrease level of another of the tires that is different from the one of the tires is less than the first threshold value.

13. A non-transitory computer-readable storage medium storing a program executable by a computer to perform processing comprising:
  acquisition processing that periodically acquires air pressure data of a plurality of tires mounted at a vehicle;
  calculation processing that, based on the air pressure data of each tire, calculates a first representative value relating to air pressures of each tire in a first period, calculates a second representative value relating to air pressures of each tire in a second period that is longer than the first period, and calculates a decrease level of the first representative value relative to the second representative value for each tire; and
  determination processing that determines that there is a decrease in air pressure when a decrease level of one of the tires is equal to or more than a first threshold value and a decrease level of another of the tires that is different from the one of the tires is less than the first threshold value.

* * * * *